(12) United States Patent
Starcevic et al.

(10) Patent No.: US 10,143,946 B2
(45) Date of Patent: Dec. 4, 2018

(54) DEVICE FOR REMOVING IMPURITIES FROM A LIQUID AND METHOD FOR CLEANING A CORRESPONDING DEVICE

(71) Applicant: HUBER SE, Berching (DE)

(72) Inventors: Nikica Starcevic, Berching (DE); Simon Abt, Thalmaessing (DE)

(73) Assignee: Huber SE, Berching (DE)

( * ) Notice: Subject to any disclaimer, the term of this patent is extended or adjusted under 35 U.S.C. 154(b) by 201 days.

(21) Appl. No.: 15/141,975

(22) Filed: Apr. 29, 2016

(65) Prior Publication Data
US 2016/0325208 A1    Nov. 10, 2016

(30) Foreign Application Priority Data

May 6, 2015    (DE) .................... 10 2015 107 028

(51) Int. Cl.
| | | |
|---|---|---|
| *B01D 33/50* | (2006.01) | |
| *B01D 33/80* | (2006.01) | |
| *B01D 33/46* | (2006.01) | |
| *B01D 33/073* | (2006.01) | |

(52) U.S. Cl.
CPC .......... *B01D 33/50* (2013.01); *B01D 33/073* (2013.01); *B01D 33/463* (2013.01); *B01D 33/801* (2013.01)

(58) Field of Classification Search
None
See application file for complete search history.

(56) References Cited

U.S. PATENT DOCUMENTS

| | | | | |
|---|---|---|---|---|
| 1,804,934 A | * | 5/1931 | Hoyt ...................... | B01D 33/21 210/327 |
| 2,839,194 A | * | 6/1958 | Lopker ................... | C01B 25/22 210/193 |
| 3,075,646 A | * | 1/1963 | Giesse ................... | B01D 33/06 134/102.1 |
| 3,169,706 A | * | 2/1965 | Ross ....................... | B05B 3/14 118/323 |

(Continued)

FOREIGN PATENT DOCUMENTS

| | | |
|---|---|---|
| DE | 1044771 B | 11/1958 |
| GB | 2504120 A | 1/2014 |
| WO | WO 02/02868 | 1/2002 |

OTHER PUBLICATIONS

Search Report issued by German Patent Office dated Dec. 12, 2015 for German Application No. 10 2015 107 028.6.

(Continued)

*Primary Examiner* — Robert J Popovics
(74) *Attorney, Agent, or Firm* — JK Intellectual Property Law, PA

(57) ABSTRACT

A device for removing impurities from a liquid, preferably sewage, includes a pivoted filtering drum having a filtering surface, equipped with a drum drive operatively connected to the filtering drum to turn the filtering drum around a rotating axis. A cleaning system cleans the filtering surface and has a guide and a spray nozzle arrangement movable back and forth along the guide. Cleaning liquid can be sprayed on the filter surface. The spray nozzle arrangement may include at least one carrier movable back and forth along the guide and at least one spray nozzle mounted on the carrier so that it can be moved around an axis. A related method for cleaning a corresponding device is disclosed.

18 Claims, 2 Drawing Sheets

(56) References Cited

U.S. PATENT DOCUMENTS

| | | | | |
|---|---|---|---|---|
| 3,521,751 A | * | 7/1970 | Holthuis | B01D 33/073 210/797 |
| 4,261,831 A | * | 4/1981 | Linsenmeyer | B01D 25/38 134/172 |
| 4,303,524 A | * | 12/1981 | Richards | B01D 35/18 210/149 |
| 4,597,862 A | * | 7/1986 | Davis | B01D 25/172 210/106 |
| 5,143,555 A | * | 9/1992 | Brady | B01D 33/073 134/42 |
| 5,149,448 A | * | 9/1992 | Mattelmaki | B01D 33/073 210/784 |
| 5,282,575 A | * | 2/1994 | Krulick | B05B 13/0415 134/172 |
| 5,423,977 A | * | 6/1995 | Aoki | B01D 33/073 210/107 |
| 5,470,472 A | * | 11/1995 | Baird | B01D 33/073 210/391 |
| 5,759,397 A | * | 6/1998 | Larsson | B01D 33/073 210/331 |
| 5,851,392 A | * | 12/1998 | Brady, Jr. | B01D 33/073 210/396 |
| 5,897,788 A | * | 4/1999 | Ketolainen | B01D 33/073 210/784 |
| 5,968,372 A | * | 10/1999 | Martensson | B01D 33/21 210/741 |
| 5,989,419 A | * | 11/1999 | Dudley | B01D 41/04 134/138 |
| 6,063,294 A | * | 5/2000 | Martensson | B01D 33/21 210/103 |
| 8,101,090 B2 | * | 1/2012 | Ralvert | B01D 33/21 210/138 |
| 8,297,447 B2 | * | 10/2012 | Sorenson | B01D 29/03 134/172 |
| 8,444,862 B2 | * | 5/2013 | Ralvert | B01D 33/21 210/138 |
| 8,518,273 B2 | * | 8/2013 | Lownertz | D21C 11/0064 162/30.11 |
| 2007/0241046 A1 | * | 10/2007 | Maupin | B01D 33/11 210/402 |
| 2007/0251891 A1 | * | 11/2007 | Lownertz | D21C 11/0064 210/791 |
| 2010/0032388 A1 | * | 2/2010 | Ralvert | B01D 33/21 210/797 |
| 2010/0108620 A1 | * | 5/2010 | Sorenson | B01D 29/03 210/791 |
| 2010/0213142 A1 | * | 8/2010 | Andersson | B01D 33/09 210/784 |
| 2012/0111805 A1 | * | 5/2012 | Ralvert | B01D 33/21 210/797 |

OTHER PUBLICATIONS

Machine Translation of Search Report issued by European Patent Office dated Sep. 21, 2016 for European Application No. 16 166 876.9.

* cited by examiner

DEVICE FOR REMOVING IMPURITIES FROM A LIQUID AND METHOD FOR CLEANING A CORRESPONDING DEVICE

CROSS-REFERENCE TO RELATED APPLICATIONS

This application claims benefit to German Patent Application No. 10 2015 107 028.6, filed May 6, 2015 which is incorporated in its entirety by reference herein.

TECHNICAL FIELD

The present disclosure refers to a device for removing impurities from a liquid, preferably from sewage, with a pivoted filtering drum equipped with a filtering surface, with a drum drive operatively connected to the filtering drum to turn the filtering drum around a rotating axis, with a cleaning system for cleaning the filtering surface, whereby the cleaning system has a guide—preferably executed as a linear drive—and a spray nozzle arrangement movable back and forth along the guide with the help of a drive, through which a cleaning liquid can be sprayed on the filtering surface.

Furthermore, a method for cleaning the filtering surface of a pivoted filtering drum is suggested that serves to remove impurities from a liquid, preferably from sewage, whereby the filtering drum is turned around a rotating axis with the help of a drum drive, whereby a spray nozzle arrangement is moved back and forth relative to the filtering surface on a predetermined trajectory, whereby a cleaning liquid is sprayed on the filtering surface with the help of at least one spray nozzle of a spray nozzle arrangement, in order to remove the residues from the filtering surface clinging to it.

BACKGROUND

Generic devices are well known in the state of the art and serve to separate solid impurities from liquids. These devices are especially used to clean municipal sewage or industrial sewage, where impurities (e.g. in form of stones or fibrous material) should be separated from a water fraction, in which case the separation performance depends, among other things, on the size of the filtering surface openings of the filtering drum.

In any case, during filtration, i.e., during the separation of the impurities, individual openings of the filtering surface are frequently clogged, so that they have to be cleaned from time to time or even continuously. This is done, for example, by spraying a cleaning liquid (which within the scope of the invention can be water or a filtering drum filtrate, for example). In this context, it is also known that the cleaning liquid is sprayed on the filtering surface with the help of one or several spray nozzles. Here, the spray nozzles are moved back and forth along a trajectory so they can spray all areas of the filtering surface with cleaning liquid.

Even if this type of cleaning already produces satisfactory cleaning results already, there is nonetheless a need to improve cleaning performance and with it, also the filtering performance of the device that will be used.

The task of the present invention is therefore to suggest a cleaning process for the corresponding devices that differs in this regard in a positive way from the known state of the art.

SUMMARY

The task is solved by a device and a method that have the characteristics of the present disclosure.

Basically, the device has a pivoted filtering drum with a preferably cylindrically executed filtering surface and a drum drive operationally connected to the filtering drum to turn it around a rotating axis that is horizontally or obliquely aligned, for example (incidentally, within the meaning of the invention, the term "filtering" is very generally understood to be the separation of solid particles from a liquid).

Moreover, the filtering surface, which can be a mesh or perforated (cylindrical) surface or with openings, for example, is assigned to a cleaning system to clean the filtering surface, whereby the cleaning system has a guide, preferably executed as a linear guide, and a spray nozzle arrangement movable back and forth along the guide with the help of a drive, through which the cleaning liquid can be sprayed on the filtering surface. To do this, the spray nozzle arrangement comprises at least one carrier (shaped like a sled, for example) that can be moved back and forth along the guide, and at least one spray nozzle mounted on the carrier, whereby the spray nozzle is connected to a piping system through which a cleaning liquid (e.g. water) can be supplied to the spray nozzle.

The spray nozzle should be mounted in such a way on the carrier that it can be moved around an axis, in which case the mounting arrangement is preferably executed so that the spray nozzle can be made to rotate (within the scope of the invention, the axis is thus preferably a rotation axis). Therefore, while the filtering surface is being cleaned, the spray nozzle not only moves back and forth along the trajectory predetermined by the guide (which preferably runs parallel to the rotating axis of the filtering drum) but rather, owing to the (rotational) movement of the spray nozzle, this movement is superimposed by an axis lying at a certain distance from the spray nozzle, in which case the axis runs preferably perpendicularly to the filtering drum's rotating axis and can separate from it. Thus, while the carrier is moved once back and forth between the end points that limit the guide on both sides, the spray nozzle moves preferably several times in a circle with regard to the axis, so that in the final analysis, the spray nozzle can move on a cycloidal trajectory during the cleaning process.

It is additionally advantageous if the spray nozzle arrangement comprises at least two spray nozzles mounted on spray nozzle arms, in which case the spray nozzle arms are aligned in different directions with regard to the axis. For example, it could be conceivable for the spray nozzle arrangement to have two spray nozzle arms that protrude in opposite directions with regard to the axis, whereby the distance of the individual spray nozzles from the axis can be the same or different for all of them. At the same time, the spray nozzle arms can serve as part of the piping system through which the cleaning liquid is supplied to the spray nozzles.

Apart from that, it should be pointed out here that the spray nozzle arrangement and the guide are preferably located outside the filtering drum, so that during the cleaning process the cleaning liquid is sprayed from the outside to the filtering surface (in this case, the liquid to be cleaned is supplied to the interior of the filtering drum, so that impurities are held back on the interior of the filtering surface and removed from the filtering surface during against the flow cleaning, i.e., against the filtration direction, and collected inside the filtering drum by a possibly existing collection device (which can be a collection basin running parallel to the rotating axis), from which they can be led away from the filtering drum.

Furthermore, it should be noted here generally for this invention—i.e., for the method described below as well— that filtration processes in which impurities are removed from the liquid with the help of the filtering surface while the latter is being sprayed with cleaning liquid can alternate. Needless to say, it is likewise also conceivable for the cleaning system to be active during the filtration process, so that the filtering surface is also continuously cleaned while the impurities are removed from the liquid.

It is additionally advantageous if the spray nozzles (or at least some of them) are arranged concentrically around the axis to prevent an imbalance while the spray nozzles rotate. In particular, the carrier should furthermore have a bearing for an axis-defining axial element extending in the direction of the rotating axis of the filtering drum and on which, in turn, spray nozzle arms have been mounted that finally support the spray nozzles or include them in their end portions.

There are additional advantages if the spray nozzle(s) is/are aligned in such a way with regard to the axis that the cleaning liquid flowing out of the spray nozzle(s) causes a rotation of the spray nozzle(s) around the axis through recoil when the spray nozzle arrangement is in operation. In this case, the spray nozzles move automatically around the axis when cleaning liquid is being supplied without needing an additional drive unit for this. To accomplish this, the spray nozzles are preferably aligned in such a way that the cleaning liquid flowing out of the spray nozzles does so at least partially in one direction that runs angled to the axis. Furthermore, all spray nozzles should be aligned so that the recoil of each cleaning liquid flowing out causes the spray nozzles to rotate in the same rotational movement.

It is likewise advantageous if the drum drive and the spray nozzle arrangement drive are coordinated, so that when the rotational speed of the filtering drum changes, there is also a change in the speed of the movement of the spray nozzle arrangement and/or vice versa. While in principle the drum drive and the spray nozzle arrangement drive can be formed by one single drive unit that is operationally connected both to the carrier of the spray nozzle arrangement and to the filtering drum through the corresponding gears, for example, it is advantageous if the drives just mentioned are separate units. If the rotational speed of the filtering drum is now increased by the corresponding control commands (for example because the filtering performance of the filtering drum needs to be adjusted), then the control of the device should be designed so it is also capable of increasing the movement speed of the spray nozzle arrangement, namely of the carrier and the spray nozzle(s) mounted on it, in order to ensure a reliable cleaning of the entire filtering surface.

There are additional advantages if the drive of the spray nozzle arrangement is designed to move the carrier, at least in sections, along the guide while the cleaning system is operating with a maximum speed of 10 m/s, preferably with a maximum speed of 7 m/s. Here, the acceleration and deceleration of the spray nozzle arrangement or the carrier in the end portions of the guide should take place as abruptly as possible to ensure the most uniform spraying pattern possible of the cleaning liquid on the filtering surface over the entire width of the filtering drum (i.e. its spatial extension in the direction of its rotating axis).

It is also advantageous if the spray nozzle has a discharge opening for the cleaning liquid to flow out, whereby the smallest separation between the discharge opening and the filtering surface is between a magnitude of 1 cm and 20 cm, preferably between 5 cm and 15 cm. If the separation lies within the above-mentioned range, then a reliable cleaning of the filtering surface can be ensured without the risk of damaging the filtering surface under the correspondingly high pressure of the impinging cleaning liquid.

It is especially advantageous if the smallest distance between the discharge opening and the axis of the spray nozzle measures between 5 cm and 30 cm, preferably between 10 cm and 25 cm. In this case, with regard to the axis, the discharge opening(s) of the spray nozzle(s) move(s) on a circle having a diameter between 10 cm and 60 cm. In this context, it must be pointed out generally that the spray nozzles should be designed so that the cleaning liquid can flow out of the discharge openings in a fan-shaped way.

Moreover, the invention refers to a method to clean the filtering surface of a pivoted filtering drum that serves to remove impurities from a liquid, preferably from sewage, whereby the filtering drum and the cleaning system to be used can have the characteristics described above or below (individually or in any combination).

In any case, the filtering drum is turned around a rotating axis with the help of a drum drive, at least during the cleaning process. Additionally, a spray nozzle arrangement is moved back and forth relative to the filtering surface on a predetermined trajectory that runs preferably linearly and parallel to the rotating axis of the filtering drum. The spray nozzle arrangement comprises, in turn, at least one spray nozzle through which a cleaning liquid (e.g. water) is sprayed on the filtering surface in order to remove the residues clinging on the filtering surface.

According to the invention, it is now suggested that during the cleaning process, the spray nozzle is moved—at least at times—around an axis at a certain distance from the discharge opening of the spray nozzle, preferably rotated, while it is moved back and forth along the above-mentioned trajectory. When the spray nozzle rotates around an axis, then it preferably describes a cycloid-shaped trajectory to clean the filtering surface very thoroughly.

There are advantages if the cleaning liquid flows out of the spray nozzle in such a way that through recoil, it causes the spray nozzle to move—preferably rotate—around the axis. In this case, no separate drive for moving the spray nozzle(s) around the axis is necessary.

It is particularly advantageous if the spray nozzle rotates around the axis with a rotational speed that it is between 0.1 revolutions per second and 100 revolutions per second, preferably between one revolution per second and 30 revolutions per second. For example, the rotational speed can be varied by changing the pressure of the cleaning liquid flowing out of the spray nozzle(s).

It is also advantageous if the filtering drum is driven with a rotational speed lying between 0.1 revolutions per minute and 10 revolutions per minute, preferably between one revolution per minute and 8 revolutions per minute, during the cleaning process. Incidentally, the cleaning process can be carried out while the liquid is being filtered, whereby continuous cleaning is possible with simultaneous filtration, so that the liquid to be filtrated makes repeated contact with a cleaned filtering surface. It is likewise advantageous if the spray nozzle arrangement is moved during the cleaning process—at least in sections—with a maximum speed of 10 m/s, preferably with a maximum speed of 7 m/s, along the trajectory.

It is additionally advantageous if during a change of the rotational speed of the filtering drum there is also a change in the rotational speed of the spray nozzle arrangement and/or vice versa. In particular, the speed of the movement of the spray nozzle arrangement should be increased (or reduced) when the rotational speed of the filtering drum is increased (or reduced) whereby the speed of the movement can be changed in proportion to the rotational speed.

In particular, it is extremely advantageous if the speed of the movement of the spray nozzle arrangement and the rotational speed of the filtering drum are coordinated in such a way that the entire filtering surface is sprayed at least once with the cleaning liquid after no more than 20 revolutions of the filtering drum, preferably after no more than three revolutions of the filtering drum. As a result of this, it is ensured that at least most of the filtering surface is cleaned when it makes contact once again with the filtering liquid (generally, the filtering drum is surrounded by the liquid only up to a certain level, although the cleaning system is arranged in the area where there is no liquid).

Finally, it is advantageous if the cleaning liquid is impinged on with a pressure amounting to between 3 bar und 200 bar, preferably between 100 bar und 200 bar, right before it flows out of the spray nozzle. This ensures a reliable cleaning of the filtering surface, i.e. reliable detachment of the impurities held back by the filtering surface, in which case the cleaning liquid should be sprayed on the side of the filtering surface facing away from the held-back impurities.

BRIEF DESCRIPTION OF THE DRAWINGS

More advantages of the invention are described in the following embodiments, which show.

DETAILED DESCRIPTION

Figure 1:
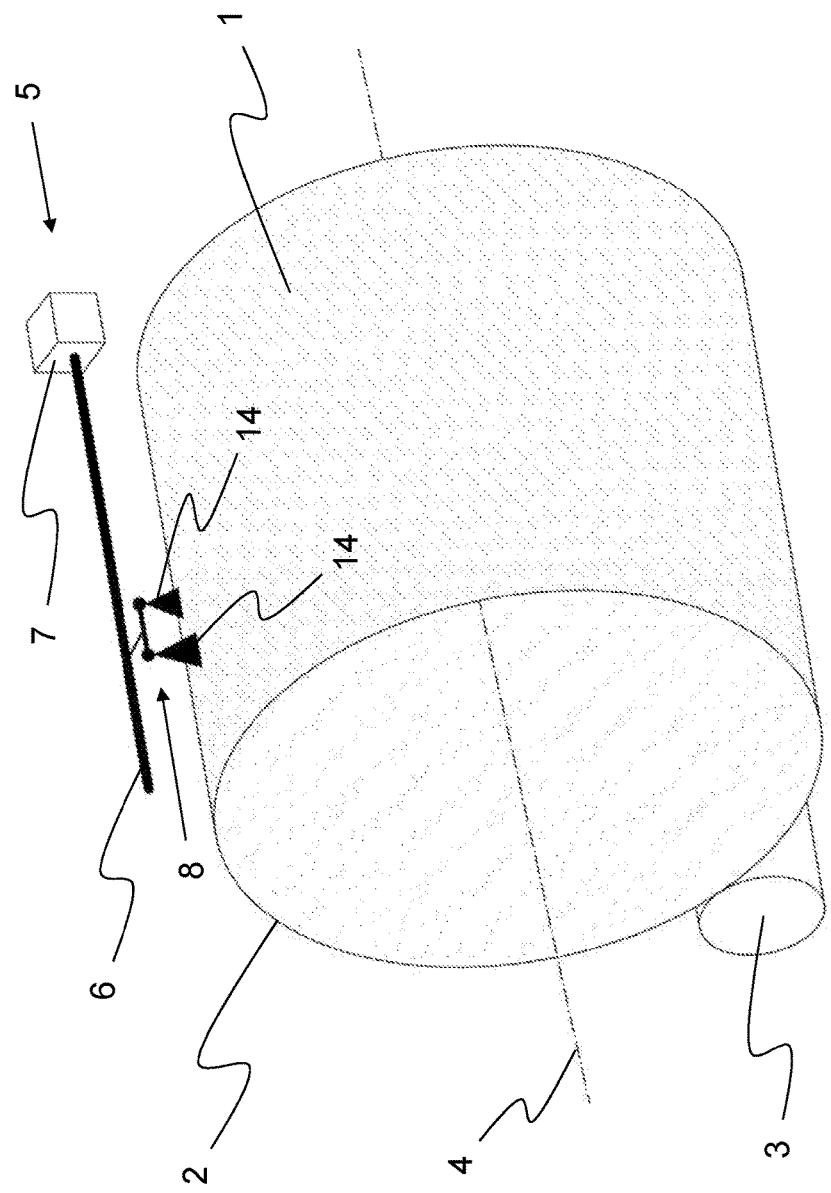
FIG. 1 is a schematic view of selected components of a device according to the invention to remove impurities from a liquid.

FIG. 1 shows schematically a device according to the invention to remove impurities from a liquid. The device comprises a filtering drum 2 pivoted (in a way not shown here) around a rotating axis 4 with a cylindrically designed filtering surface 1 (which can be formed, for example, by a mesh or a perforated metal surface). In its front sides, the filtering drum 2 can be closed except for an inflow for the liquid and an outflow for the separated impurities. Likewise, the filtering drum 2 can be partially submerged into the liquid to be treated and/or be equipped with a collection basin (not shown) running inside the filtering drum 2, into which the impurities reaching the top fall while the filtering drum 2 turns (moved by a corresponding drum drive 3).

Figure 2:
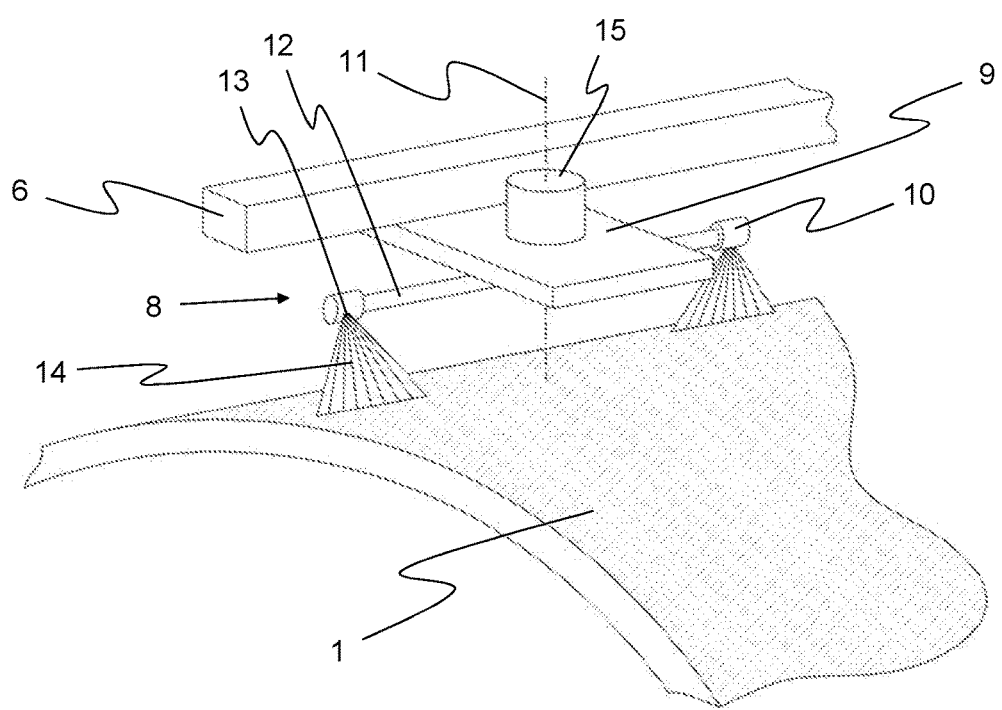
FIG. 2 is a schematic view of a portion of the cleaning system shown in FIG. 1.

Regardless of the exact design of the device, a cleaning system 5 to clean the filtering surface 1 is provided, whose essential components are shown in FIGS. 1 and 2.

In principle, the cleaning system 5 comprises a guide 6, on which the spray nozzle arrangement 8 that can be moved back and forth along the guide 6 with the help of a drive 7 is mounted (whereby the guide 6 preferably runs parallel to the rotating axis 4 of the filtering drum 2). The spray nozzle arrangement 8, in turn, comprises a carrier 9 mounted on the guide 6 on which two spray nozzles 10 are mounted over a bearing 15 in the embodiment shown, whereby the bearing 15 makes it possible for the spray nozzles 10 to rotate around an axis 11 (the spray nozzles 10 or their discharge openings 13 are in each case separated from the axis 11 by a spray nozzle arm 12).

If a cleaning liquid 14 is now supplied to the spray nozzles 10 with high pressure (see magnitudes above), then it flows out of the discharge openings 13 preferably in a fan-shaped way, as can be seen very well in FIG. 2. Finally, if the discharge openings 13 are aligned so that the cleaning liquid 14 always flows out of the spray nozzles 10 in the same rotational direction, then the spray nozzles 10 rotate automatically around the axis 11 during the cleaning process. In case of the orientation shown in FIG. 2, the spray nozzles 10 would rotate clockwise in a top view of the axis 11.

Furthermore, the spray nozzles 10 are moved by the movement of the carrier 9 along the guide 6 over the entire width (i.e. the spatial extension in the direction of the rotating axis 4) of the filtering drum 2. Since the filtering drum 2 also turns around its rotating axis 4 at least during the cleaning process, in the final analysis the entire filtering surface 1 is sprayed by the cleaning liquid 14 during the course of a certain cleaning time and this leads to the removal of the captured impurities.

The present invention is not restricted to the embodiments shown and described. Variations within the framework of the patent claims are just as possible as any combination of the described characteristics, even if they are shown and described in different sections of the description or the claims or in different embodiments.

The invention claimed is:

1. A device to remove impurities from a liquid, the device comprising:
a pivoted filtering drum having a filtering surface;
a drum drive operatively connected to the filtering drum to turn the filtering drum around a rotating axis; and
a cleaning system to clean the filtering surface, the cleaning system having a guide and a spray nozzle arrangement movable back and forth along the guide via a drive, through which a cleaning liquid can be sprayed on the filtering surface, the spray nozzle arrangement including at least one carrier movable back and forth along the guide and at least one spray nozzle mounted on the carrier in such a way that the at least one spray nozzle can be moved around a nozzle axis located in a direction extending through the carrier and the filtering surface of the drum.

2. A device according to claim 1, wherein the spray nozzle arrangement comprises at least two of the spray nozzles arranged on spray nozzle arms, wherein the spray nozzle arms are aligned in different directions with regard to the nozzle axis.

3. A device according to claim 2, wherein the spray nozzles are arranged concentrically around the nozzle axis.

4. A device according to claim 1, wherein the at least one spray nozzle is aligned in such a way with regard to the nozzle axis that the cleaning liquid that flows out of the at least one spray nozzle when the spray nozzle arrangement is operating makes the at least one spray nozzle rotate around the nozzle axis owing to recoil, so that the at least one spray nozzle is made to rotate without an additional drive unit.

5. A device according to claim 1, wherein the drum drive and the drive of the spray nozzle arrangement are coordinated, wherein when one of a rotational speed of the filtering drum and a speed of movement of the spray nozzle arrangement changes, the other of the rotational speed of the filtering drum and the speed of the movement of the spray nozzle arrangement also changes.

6. A device according to claim 1, wherein the drive of the spray nozzle arrangement moves the carrier along the guide while the cleaning system is operating, at least at times with a maximum speed of 10 m/s.

7. A device according to claim 1, wherein the spay nozzle has a discharge opening for the cleaning liquid to flow out, wherein a shortest distance between the discharge opening and the filtering surface is between 1 cm and 20 cm.

8. A device according to claim 7, wherein a shortest distance between the discharge opening of the spray nozzle and the axis of the spray nozzle is between 5 cm and 30 cm.

9. A device according to claim 1, wherein the nozzle axis is located substantially perpendicular to the rotating axis of the filtering drum.

10. A method to clean a filtering surface of a pivoted filtering drum that removes impurities from a liquid, the method comprising the steps of:

rotating the filtering drum around a rotating axis via a drum drive;

moving a spray nozzle arrangement back and forth on a predetermined trajectory relative to the filtering surface; and spraying with at least one spray nozzle of the spray nozzle arrangement a cleaning liquid on the filtering surface in order to remove the residues on the filtering surface from the filtering surface, the spray nozzle being moved at least at times around a nozzle axis while it is moved back and forth along the predetermined trajectory, the nozzle axis being located in a direction extending through the spray nozzle arrangement and the filtering surface of the drum.

11. A method according to claim 10, wherein the cleaning liquid flows out of the spray nozzle so as to cause a rotation of the spray nozzle around the nozzle axis.

12. A method according to claim 11, wherein the spray nozzle rotates around the nozzle axis with a rotational speed of between 0.1 revolutions per second and 100 revolutions per second.

13. A method according to claim 10, wherein the filtering drum moves with a rotational speed during the cleaning process between 0.1 revolutions per minute and 10 revolutions per minute.

14. A method according to claim 10, wherein during the cleaning process, the spray nozzle arrangement is moved at least at times with a maximum speed of 10 m/s, along the predetermined trajectory.

15. A method according to claim 10, wherein when one of a rotational speed of the filtering drum and a speed of movement of the spray nozzle arrangement is changed, the other of the rotational speed of the filtering drum and the speed of the movement of the spray nozzle arrangement is also changed.

16. A method according to claim 10, wherein a speed of the movement of the spray nozzle arrangement and a rotational speed of the filtering drum are coordinated in such a way that the entire filtering surface is sprayed at least once with the cleaning liquid after no more than 20 revolutions of the filtering drum.

17. A method according to claim 10, wherein the cleaning liquid just before flowing out of the spray nozzle has a pressure between 3 bar and 200 bar.

18. A method according to claim 10, wherein the nozzle axis is located substantially perpendicular to the rotating axis of the filtering drum.

* * * * *